United States Patent
Eberth et al.

(10) Patent No.: US 8,262,141 B2
(45) Date of Patent: Sep. 11, 2012

(54) DOCKING AND UNDOCKING OF LIQUID CARRYING LINES TO AND FROM A DOCKING BODY

(75) Inventors: Ulrich Eberth, Stade (DE); Martin Friedrich, Harsum (DE); Hans-Martin Krafft, Stade (DE)

(73) Assignees: Airbus Operations GmbH (DE); Deutsches Zentrum für Luft- und Raumfahrt e.V. (DLR) (DE)

( * ) Notice: Subject to any disclaimer, the term of this patent is extended or adjusted under 35 U.S.C. 154(b) by 745 days.

(21) Appl. No.: 11/992,177

(22) PCT Filed: Sep. 20, 2006

(86) PCT No.: PCT/EP2006/009157
§ 371 (c)(1),
(2), (4) Date: May 5, 2009

(87) PCT Pub. No.: WO2007/039115
PCT Pub. Date: Apr. 12, 2007

(65) Prior Publication Data
US 2009/0250921 A1    Oct. 8, 2009

Related U.S. Application Data

(60) Provisional application No. 60/720,638, filed on Sep. 26, 2005.

(30) Foreign Application Priority Data

Sep. 26, 2005   (DE) .......................... 10 2005 045 845

(51) Int. Cl.
    *F16L 21/02*   (2006.01)

(52) U.S. Cl. ............. 285/374; 285/347; 285/13; 137/13
(58) Field of Classification Search ................ 285/374, 285/347, 8, 239, 332, 332.2, 332.3, 13; 138/32, 138/33; 137/13, 2
See application file for complete search history.

(56) References Cited

U.S. PATENT DOCUMENTS

| | | | | | |
|---|---|---|---|---|---|
| 1,325,826 | A | * | 12/1919 | Baker et al. | 285/332.2 |
| 1,461,385 | A | * | 7/1923 | Falor | 285/332.2 |
| 1,948,762 | A | * | 2/1934 | Kirkpatrick | 285/347 |
| 2,314,386 | A | * | 3/1943 | Brend | 285/332.3 |
| 2,362,686 | A | * | 11/1944 | De Lano | 285/332.3 |

(Continued)

FOREIGN PATENT DOCUMENTS

CH          476251          7/1969

(Continued)

*Primary Examiner* — David E Bochna
(74) *Attorney, Agent, or Firm* — Lerner, David, Littenberg, Krumholz & Mentlik, LLP

(57) ABSTRACT

A docking system for docking a liquid stream carrying line to a docking body, includes a line end having a first form that is conically tapered in the direction of flow and a docking interface which is situated on the docking body and has a second form that is conically tapered in the direction of flow. The first conically tapered form and the second conically tapered form are adapted to one another in such a way that, in the docked state, they are mutually set apart in one coupling region by an interspace defined by a sealing ring, concentrically opposing one another. The first conically tapered form is equipped on its periphery with at least one cleaning element, which extends from the first conically tapered form toward the second conically tapered form in order to capture liquid that may accumulate in the interspace.

20 Claims, 2 Drawing Sheets

U.S. PATENT DOCUMENTS

| | | | | |
|---|---|---|---|---|
| 2,809,853 A * | 10/1957 | Nathan | | 285/347 |
| 3,345,087 A * | 10/1967 | Hanes et al. | | 285/332.3 |
| 3,615,109 A * | 10/1971 | Brinda et al. | | 285/332.2 |
| 3,695,632 A | 10/1972 | Kruse et al. | | |
| 3,792,878 A * | 2/1974 | Freeman | | 285/347 |
| 3,830,530 A * | 8/1974 | Glover | | 285/347 |
| 4,206,938 A | 6/1980 | Bartell | | |
| 4,460,398 A * | 7/1984 | Sasaki | | 137/13 |
| 4,801,160 A * | 1/1989 | Barrington | | 285/332.3 |
| 5,125,427 A * | 6/1992 | Cantu et al. | | 137/13 |
| 5,429,155 A | 7/1995 | Brzyski et al. | | |
| 5,797,627 A * | 8/1998 | Salter et al. | | 285/276 |
| 6,557,575 B1 * | 5/2003 | Gerhardt et al. | | 137/13 |
| 7,503,083 B2 * | 3/2009 | Ball | | 285/332.2 |
| 2002/0109023 A1 | 8/2002 | Thomas et al. | | |

FOREIGN PATENT DOCUMENTS

| | | |
|---|---|---|
| DE | 2011768 | 9/1971 |
| DE | 2701916 | 7/1978 |
| DE | 4041337 | 6/1992 |
| DE | 4414102 | 11/1994 |
| DE | 10239032 | 3/2004 |
| EP | 300405 | 1/1989 |
| FR | 1542185 | 10/1968 |
| JP | 06341584 A | 12/1994 |
| JP | 11-063364 | 3/1999 |
| WO | 88/06253 | 8/1988 |
| WO | 2004/085753 | 10/2004 |

* cited by examiner

DOCKING AND UNDOCKING OF LIQUID CARRYING LINES TO AND FROM A DOCKING BODY

This application claims the benefit of the filing date of the German Patent Application No. 10 2005 045 845.9 filed Sep. 26, 2005 and of the U.S. Provisional Patent Application No. 60/720,638 filed Sep. 26, 2005, the disclosures of which are hereby incorporated herein by reference.

FIELD OF THE INVENTION

The present invention relates generally to the technical field of tool engineering. More particularly, the present invention relates to a docking system for docking and undocking a liquid carrying line to and from a docking body. The present invention also relates to a specially designed line end for docking a liquid carrying line to a docking interface of a docking body. Finally, the present invention relates to a method for preventing liquid from continuing to flow when a line end of a liquid carrying line is undocked from a docking interface of a docking body.

TECHNOLOGICAL BACKGROUND

Docking systems for liquid carrying lines typically have a self-closing end valve including a ball, for example, or a membrane or the like, that automatically closes when the line end is undocked from the docking interface to which it is connected.

Such docking systems are only conditionally suited for the field of fiber-composite component production, however, since self-closing end valves of this kind have the tendency to stick due to the resins used in the manufacture of fiber composite components. Thus, a method for manufacturing fiber composite components provides for layering individual sheets of fibrous material, nonwoven fabric or woven fabric into a mold, to which a resin is applied once the individual fiber layers have been introduced, in order to join and interconnect the individual fiber layers. In this context, the resin is supplied from a reservoir via a line to the mold and injected into the same under pressure.

In as much as a liquid is concerned in the context of the present invention, subsumed thereunder are reactive liquids, which, in the field of composite component production, are used for joining individual fibrous layers. These include synthetic resins in particular, which cure under the action of temperature. In particular, these are synthetic resins, such as hydrocarbon, urea, alkyd, epoxide, melamine, phenolic, polyester, unsaturated polyester, polyurethane, ketone, coumaron-indene, isocyanate, polyamide and terpene-phenolic resins, for example. Moreover, in the context of the present invention, the previously discussed molds, into which the individual fiber layers can be introduced in order to be joined together, as well as the reservoirs in which the liquids are stored, are termed docking bodies.

Due to the difficulty discussed above, whereby the aforementioned self-closing end valves used in the field of fiber composite component production have a tendency to stick because of the adhesive action of the liquids used, another problem associated with the known docking systems is that, when a liquid carrying line is undocked from a docking body, certain residual quantities of liquid typically continue to flow, causing the docking interface on the docking body to be contaminated or soiled, resulting in increasing leakage problems from one docking operation to another. Moreover, due to inevitable tolerances, over a plurality of docking operations, dirt unavoidably accumulates along the sealing surfaces of the docking system in the region of the docking interface, which ultimately can lead to failure of the sealing means of the docking system.

Due to the problems described here, known methods have so far been unable to successfully provide a partially automated docking system, which is why, until now, the connection between the docking body and the liquid carrying line is typically produced manually by clamping a tube onto a hose connector on the docking body, using a hose clamp.

SUMMARY OF THE INVENTION

Starting out from the problems delineated above, the object of the present invention is to provide at least one realization approach which will make it possible to at least partially alleviate the problem experienced with leakage in the area of the docking interface.

This objective is achieved by a docking system for docking a liquid carrying line to a docking body, by a line end for docking a liquid carrying line to a docking interface of a docking body, as well as by a method for preventing liquid from continuing to flow when undocking a line end of a liquid carrying line from a docking interface of a docking body.

The docking system according to the invention for docking a liquid carrying line to a docking body includes a line end having a first form that tapers conically in the direction of flow, as well as a docking interface situated on the docking body having a second form that tapers conically in the direction of flow. Here, the two conically tapered forms are adapted to one another in such a way that, in a docked state, they are mutually set apart in one coupling region by an interspace and concentrically oppose one another, the interspace being predefinable by a sealing ring, such as an O-ring seal for example, situated between the two conically tapered forms, concentrically to the same. In this context, the purpose of the sealing ring is to prevent liquid from escaping through the interspace, which sets apart the two mutually opposed conically tapered forms. To be able to remove liquid which may settle in the interspace between the two conically tapered forms, the first conically tapered form is equipped on its periphery with at least one cleaning element which extends from the first conically tapered form toward the second conically tapered form in order to capture liquids that may accumulate in the interspace. In this context, the cleaning element may extend, for example, into the interspace between the two conically tapered forms. Since the liquid solidifies under the action of temperature, the cured liquid is able to be removed in this manner from the coupling region in that the line end is uncoupled from the docking body, with the result that the cured liquid in the coupling region, being entrained by the line end, is removed from the docking interface, since the cleaning element is entrapped in the cured liquid.

The action of temperature may be produced, for instance, by providing heater filaments in the coupling region, for example, in order to heat and thus cure the liquids that have settled in the interspace. Alternatively, however, cooling tubes may likewise be placed in the coupling region in order to temporarily cool the same, thereby enabling the liquid to be temporarily frozen in the interspace and thus likewise hardened. This second alternative, which provides for cooling the coupling region, may prove to be advantageous in that the thus achieved hardening of the liquid is only of temporary duration. Alternatively, it is likewise possible, however, for an externally produced temperature flow in the form of cold or heat to act upon the coupling region.

The starting point for the present invention is, in fact, the manufacture of fiber composite components. Naturally, however, the present invention is also suited for other fields which require connecting liquid carrying lines to a docking body and in which the described manifestations of sticking and of encrustation may occur in the area of the docking site. Thus, the present invention is also applicable to other fields, such as injection-molded parts production or the food-processing industry, i.e., wherever curable liquids are introduced under pressure via a line into a mold. Depending on whether the line end is slid into the docking body, or the line end receives the docking body by way of its docking interface, the first conically tapered form is an outside cone, and the second conically tapered form is an inside cone; respectively, the first conically tapered form is an inside cone, and the second conically tapered from is an outside cone.

Thus, in the case that the first conically tapered form is able to fit into the second conically tapered form, the first form is an outside cone and the second form is an inside cone. In this case, the cleaning element encircles the outer periphery of the first conically tapered form and extends out from the same toward the second conically tapered form. However, in the case that the second conically tapered form is able to fit into the first conically tapered form, the second conically tapered form is an outside cone, and the first conically tapered form is an inside cone. In this case, the cleaning element encircles the inner periphery of the first conically tapered form and extends radially into the interspace.

To ensure that the cleaning element becomes entrapped in the desired manner in the cured liquid that has accumulated in the interspace between the two conically tapered forms, it is positioned in the direction of flow downstream of the sealing ring. The direction of flow is understood here to be the global direction of flow of the liquid carrying line and not the flow in the interspace between the two conically tapered forms whose direction is essentially opposite that of the global direction of flow. By positioning the cleaning element in this manner, it becomes entrapped in the desired manner in the liquid that has settled in the interspace, so that, during the undocking operation, the cleaning element removes the liquid that has cured in the interspace out from the coupling region in the area of the docking interface, entraining the same.

The above-described specific embodiments of the docking system are based on the assumption that the liquid that has accumulated in the interspace is in its hardened state, which makes it possible to remove the same using the cleaning element that has become entrapped in the cured liquid. Alternatively, the cleaning element may also be designed as a scraper, in which case the first conically tapered form may be fabricated of an elastic material that deforms in response to an undocking of the line end from the docking body in such a way that the cleaning element rubs along the second conically tapered form and, in the process, scrapes off the liquid that has settled in the interspace from the second conically tapered form.

To effectively prevent liquid from continuing to flow when the line end is undocked from the docking interface of the docking body, the coupling region may be designed to receive the action of a temperature flow. Thus, heater filaments may be provided in the coupling region, for example, in order to temporarily heat the same, causing the liquid contained in the coupling region at the particular moment to cure, thereby preventing the liquid from continuing to flow following an undocking operation.

Alternatively, however, cooling tubes may likewise be placed in the coupling region, for example, in order to temporarily cool the same, thereby enabling the liquid to be temporarily frozen and thus likewise hardened, so that an undocking operation is essentially possible without liquid continuing to flow. This second alternative in which the coupling region is cooled may prove to be advantageous in that the hardening of the liquid achieved in this manner is only of temporary duration.

Alternatively, it is likewise possible, however, for an externally produced temperature flow in the form of cold or heat to act upon the coupling region.

Since the liquid hardens permanently when heated, making the line end unusable for further docking operations, the line end may be designed as a separate line piece which is couplable to the liquid carrying line, allowing it to be replaced following an undocking operation subsequently to the action of heat on the coupling region.

The line end according to the invention for docking a liquid stream carrying line to a docking interface of a docking body having a second form that is conically tapered in the direction of flow includes a first form that is conically tapered in the direction of flow and is adapted to the second conically tapered form in such a way that, in the docked state, it is situated in concentric opposition to the same, set apart by an interspace defined by a sealing ring. In this case, the first conically tapered form is provided on its periphery with at least one cleaning element which extends from the first conically tapered form in the direction of the second conically tapered form. In this context, the cleaning element may extend into the interspace in order to capture liquid that is able to accumulate therein.

As already previously described, the first conically tapered form may be designed to fit into the second conically tapered form. In this case, the cleaning element encircles the outer periphery of the first conically tapered form, forming a collar-like projection. Alternatively, the first conically tapered form may be designed to receive the second conically tapered form. In this case, the cleaning element encircles the inner periphery of the first conically tapered form, forming a collar-like projection, and extends radially into the interspace. In order for the cleaning element to become reliably entrapped in the desired manner in the liquid that is able to accumulate in the interspace, it is positioned in the direction of flow downstream of the sealing ring, whereby the previously given explanations regarding the direction of flow apply.

In order for the cleaning element to be able to fulfill a scraping function to scrape off liquid that has settled on the second conically tapered form, the first conically tapered form may be fabricated of an elastic material that deforms in response to an undocking of the line end from the docking body in such a way that the cleaning element rubs along the second conically tapered form in order to scrape off the liquid that has settled thereon.

In contrast to the previously described known docking method which employs a hose clamp, whereby liquid is prevented from being able to continue to flow during an undocking operation by manually squeezing the tube, to prevent liquid from continuing to flow when undocking a line end of a liquid carrying line from a docking interface of a docking body, the method according to the present invention provides for a temperature flow in the form of heat or cold to be applied to a coupling region between the docking interface and the line end, causing the liquid in the docking interface and in the line end to harden at least temporarily. This makes it possible to prevent liquid from continuing to flow during the undocking operation and thus likewise prevent any contamination or soiling of the docking interface.

BRIEF DESCRIPTION OF THE DRAWINGS

The present invention is described in the following with reference to the enclosed drawings, in light of embodiments, which are purely exemplary. These exemplary embodiments merely serve to a better understanding of the present invention and, in particular, should not be interpreted as limiting its scope of protection. Specifically, the figures show.

In all of the figures, equivalent or similar elements are denoted by the same or by corresponding reference numerals.

DESCRIPTION OF EXEMPLARY EMBODIMENTS OF THE INVENTION

Figure 1:
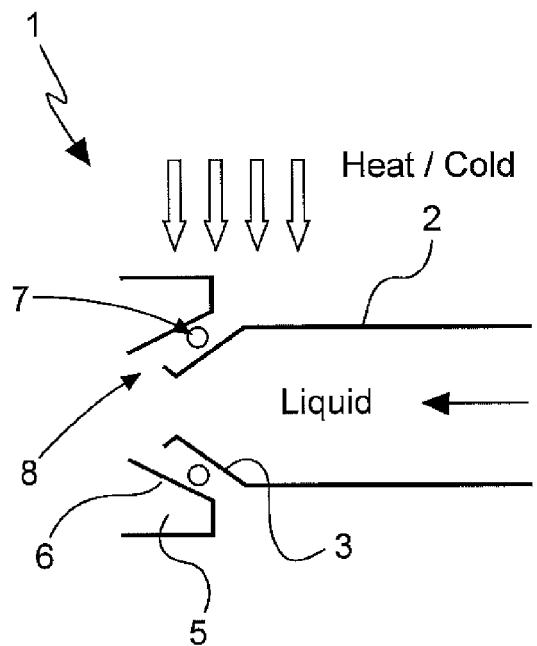
FIG. 1 a schematic cross-sectional view through a first specific embodiment of a docking system.

A first specific embodiment of a docking system 1 according to the present invention, in which a line end 2 is fitted into a docking interface 5, is initially described with reference to the cross-sectional representation of FIG. 1 and the isometry of FIG. 3. In this context, docking interface 5 is a part of a docking body 4, as is discernible in FIG. 3. The purpose of docking body 4 is to accommodate a multiplicity of fiber layers in cavity 9, to join and interconnect the same using a liquid that is injected via line end 2 into the docking body under pressure.

As may be inferred from FIG. 1, docking interface 5 situated in docking body 4 has a form that is conically tapered in the direction of flow. Correspondingly, line end 2 also has a form that is conically tapered in the direction of flow, so that cone form 6 of docking interface 5 is able to receive cone form 3 of line end 2. Conically tapered form 3 of line end 2 is encircled by a sealing ring 7, which is used for sealing docking interface 5, so that during a process of injecting into form 4, no liquid is able to penetrate to the outside. To achieve a most optimal possible sealing action, cone form 3 of line end 2 is tapered in the direction of flow to a greater degree than cone form 6 of docking interface 5, with the result that, when line end 2 is slid by way of its cone form 3 into docking interface 5, sealing means 7 comes in contact, on the one hand, with cone form 6 and, on the other hand, with cone form 3, and, as line end 2 is pushed in further, sealing means 7 rolls along cone form 3 and is compressed, making it possible to improve the sealing action of sealing means 7.

As FIG. 1 shows, cone form 3 of line end 2 and cone form 6 of docking interface 5 are adapted to one another in such a way that, in the docked state, they are situated in concentric opposition to one another, set apart by an interspace defined by the sealing ring. Since the liquid is injected under pressure into the docking body, which may result in a backup of the liquid in docking interface 5, liquid may back up in the interspace up to sealing means 7 and accumulate there. To be able to easily remove this liquid that has accumulated in this manner, cone form 3 of line end 2 is equipped at its end on the peripheral side with a cleaning element 8, which encircles line end 2 at the end of cone form 3 forming a collar-like projection. In this context, cleaning element 8 extends from cone form 3 toward cone form 6, in order to become entrapped in the liquid that has accumulated in the interspace.

If, at this point, a heat or cold flow is applied to the coupling region between docking interface 5 and line end 2, then this would lead to at least a temporarily hardening of the backed-up liquid that has settled in the interface. If line end 2 is then pulled out of docking interface 5, then this would result that the cleaning element 8, which has become entrapped in the cured liquid, pulls this liquid out of the coupling region such that the cone form 6 of docking interface 5 is free of any contamination. Thus, no additional cleaning or only minimal manual further cleaning of the docking interface is needed to be able to once again dock a line end 2 to docking interface 5.

Another specific embodiment of a docking system is described with reference to FIG. 2. In this case, the first conically tapered form receives the second conically tapered form. As may be inferred from FIG. 2, docking interface 5 has a form that is conically tapered in the direction of flow. Correspondingly, line end 2 also has a form that is conically tapered in the direction of flow, so that cone form 3 of line end 2 is able to receive docking interface 5 of docking body 5. A sealing ring 7, which is used for sealing docking interface 5, is set in conically tapered form 3 of the line end, to ensure that no liquid is able to penetrate to the outside. To achieve a most optimal possible sealing action, cone form 3 of line end 2 is tapered in the direction of flow to a lesser degree than cone form 6 of docking interface 5, with the result that, when line end 2 is slid by way of its cone form 3 onto docking interface 5, sealing means 7 comes in contact, on the one hand, with cone form 6 and, on the other hand, with cone form 3, and, as line end 2 is pushed in further, sealing means 7 rolls along cone form 6, making it possible to improve the sealing action of sealing means 7.

Figure 2:
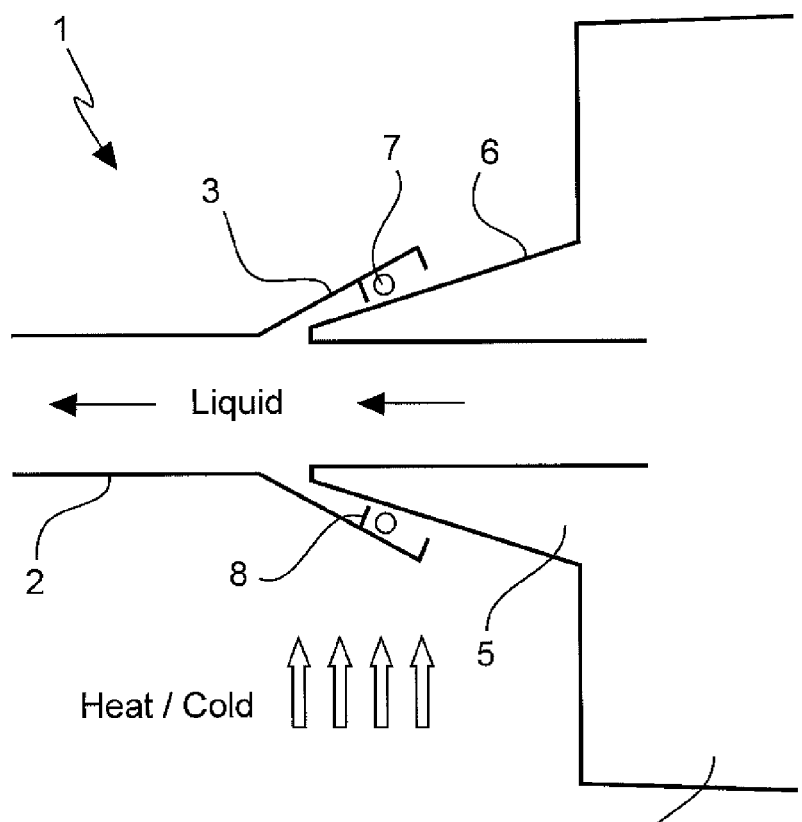
FIG. 2 another schematic cross-sectional view through another specific embodiment of a docking system.

As FIG. 2 shows, cone form 3 of line end 2 and cone form 6 of docking interface 5 are adapted to one another in such a way that, in the docked state, they are spaced apart by an interspace defined by sealing ring 7 and concentrically oppose one another. Since the liquid is pressed out of the docking body under pressure, which may result in a backup of the liquid in the region of docking interface 5, liquid may back up in the interspace up to sealing means 7 and accumulate there. To be able to easily remove this liquid that has accumulated in this manner, cone form 3 of line end 2 is provided on its inner periphery with a cleaning element 8, which encircles line end 2, forming a collar-like projection. In this context, cleaning element 8 extends from cone form 3 toward cone form 6, in order to become entrapped in the liquid that has accumulated in the interspace.

If, at this point, a heat or cold flow is applied to the coupling region between docking interface 5 and line end 2, then this would lead to the backed-up liquid that has settled in the interface hardening at least temporarily. If line end 2 is then pulled out of docking interface 5, then this would result the cleaning element 8, which has become entrapped in the cured liquid, to pull this liquid out of the coupling region, such that cone form 6 of docking interface 5 is free of any contamination. Thus, no additional cleaning or only minimal manual further cleaning of docking interface 5 is needed to be able to once again dock a line end 2 to docking interface 5.

Figure 3:
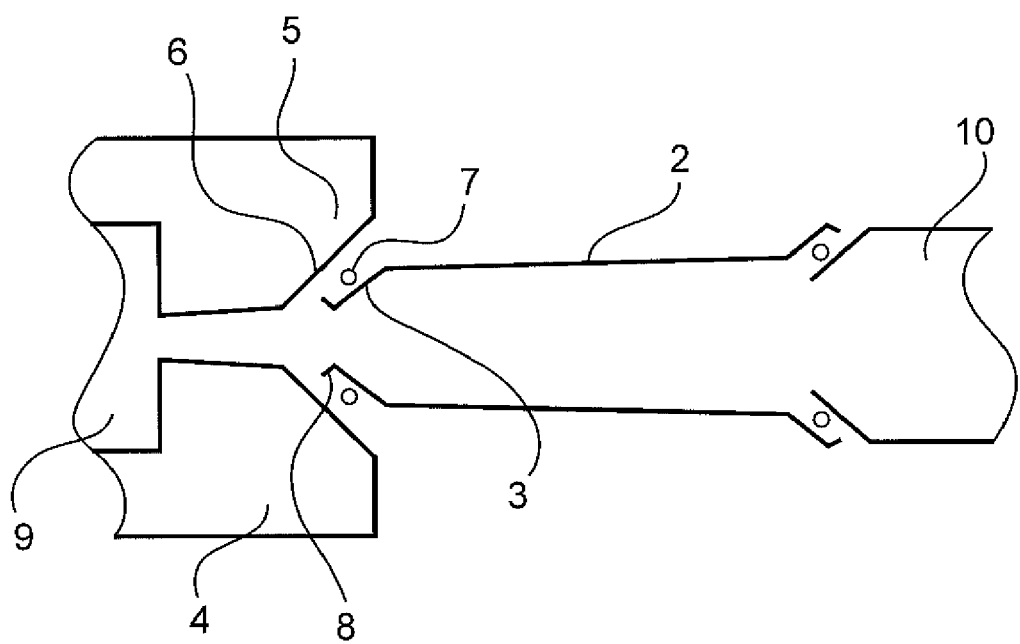
FIG. 3 yet another cross-sectional view of another specific embodiment of a docking system according to the present invention having a separately designed line end.

Finally, as may be inferred from FIG. 3, line end 2 may be designed as a separate line piece, which is couplable to liquid carrying line 10. This type of separate construction of line end 2 may prove to be useful in that it allows line end 2 to be designed as a replaceable, disposable component that may simply be discarded following a docking and undocking operation. This obviates the need for painstakingly removing liquid residues adhering to cone form 3 of line end 2 that are entrained when line end 2 is undocked from docking interface 5. Rather, line end 2 is simply replaced, enabling liquid carrying line 10, along with a new line end 2, to be docked again to docking body 4.

It is additionally noted that "including" does not exclude other elements or steps, and "a" or "one" does not exclude "a plurality of." It is also noted that features or steps, which have been described with reference to one of the above exemplary embodiments, may also be used in combination with other features or steps of other exemplary embodiments described above. Reference numerals used in the claims are not to be regarded as limiting.

List of Reference Numerals
1 docking system
2 line end
3 cone form of the line end
4 docking body
5 docking interface
6 cone form of the docking interface
7 sealing ring
8 cleaning element
9 cavity
10 liquid carrying line

What is claimed is:

1. A docking system for docking a liquid stream carrying line to a docking body, comprising:
    a line end having a first form that is conically tapered in the direction of flow;
    a docking interface, situated on the docking body, having a second form that is conically tapered in the direction of flow;
    at least one cleaning element equipped on the periphery of the first conically tapered form and extending from the first conically tapered form toward the second conically tapered form; and
    a sealing ring between and setting apart the first conically tapered form and the second conically tapered form from one another, thereby defining an interspace therebetween,
    wherein the first conically tapered form and the second conically tapered form are adapted to one another such that, in the docked state, they are mutually set apart in a coupling region by the interspace and concentrically oppose one another,
    wherein the interspace is present substantially along the entire length of the coupling region; and
    wherein the at least one cleaning element is configured to capture the liquid that accumulates in the interspace.

2. The docking system according to claim 1, wherein the first conically tapered form fits into the second conically tapered form.

3. The docking system according to claim 2, wherein the cleaning element encircles the outer periphery of the first conically tapered form, forming a collar-like projection, and extends radially into the interspace.

4. The docking system according to claim 1, wherein the second conically tapered form fits into the first conically tapered form.

5. The docking system according to claim 4, whereby the cleaning element encircles the inner periphery of the first conically tapered form, forming a collar-like projection, and extends radially into the interspace.

6. The docking system according to claim 1, wherein the cleaning element is positioned in the direction of flow downstream of the sealing ring.

7. The docking system according to claim 1, wherein the first conically tapered form is fabricated of an elastic material that deforms in response to an undocking of the line end from the docking body such that the cleaning element rubs along the second conically tapered form.

8. The docking system according to claim 1, wherein the coupling region is configured to receive the action of a temperature flow.

9. The docking system according to claim 1, wherein the line end comprises a separate line piece which is couplable to the liquid stream carrying line.

10. The docking system according to claim 1, wherein the first conically tapered form of the line end is conically tapered to a greater degree than the second conically tapered form of the docking interface.

11. A line end for docking a liquid carrying line to a docking interface of a docking body having a second form that is conically tapered in the direction of flow, said line end comprising:
    a first form that is conically tapered in the direction of flow, which is adapted to the second conically tapered form in such a way that, in the docked state, the first form is situated in concentric opposition to the second form, set apart by an interspace defined therebetween by a sealing ring setting the first and second forms apart from one another,
    at least one cleaning element equipped on the periphery of the first conically tapered form and extending from the first conically tapered form toward the second conically tapered form;
    wherein the interspace is present substantially along the entire length of the coupling region; and
    wherein the at least one cleaning element is configured to capture the liquid that accumulates in the interspace.

12. The line end according to claim 11, wherein the first conically tapered form is configured to fit into the second conically tapered form.

13. The line end according to claim 12, wherein the cleaning element encircles the outer periphery of the first conically tapered form, forming a collar-like projection, and extends radially into the interspace.

14. The line end according to claim 11, wherein the first conically tapered form is configured to receive the second conically tapered form.

15. The line end according to claim 14, wherein the cleaning element encircles the inner periphery of the first conically tapered form, forming a collar like projection, and extends radially into the interspace.

16. The line end according to claim 11, wherein the cleaning element is positioned in the direction of flow downstream of the sealing ring.

17. The line end according to claim 11, wherein the first conically tapered form is fabricated of an elastic material that deforms in response to an undocking of the line end from the docking body such that the cleaning element rubs along the second conically tapered form.

18. The line end according to claim 11, wherein the line end is comprises a separate line piece that is couplable to the liquid stream carrying line.

19. The line end according to claim 11, wherein the first conically tapered form of the line end is conically tapered to a greater degree than the second conically tapered form of the docking interface.

20. A method for preventing liquid from being able to continue to flow when a line end of a liquid stream carrying line is undocked from a docking interface of a docking body, the line end being for docking a liquid carrying line to a docking interface of a docking body having a second form that is conically tapered in the direction of flow, said line end comprising:
    a first form that is conically tapered in the direction of flow, which is adapted to the second conically tapered form in such a way that, in the docked state, the first form is situated in concentric opposition to the second form, set apart by an interspace defined therebetween by a sealing ring setting the first and second forms apart from one another, and wherein the first conically tapered form is equipped on its periphery with at least one cleaning element, which extends from the first conically tapered form toward the second conically tapered form in order to capture liquid that may accumulate in the interspace,
wherein the method comprises:

applying a temperature flow to a coupling region between the docking interface and the line end, causing the liquid in the docking interface and in the line end to harden at least temporarily.

* * * * *